US006759977B1

(12) United States Patent
Edvardsson et al.

(10) Patent No.: US 6,759,977 B1
(45) Date of Patent: Jul. 6, 2004

(54) METHOD AND APPARATUS FOR RADAR-BASED LEVEL GAUGING

(75) Inventors: Kurt Olov Edvardsson, Taby (SE); Jan Westerling, Linköping (SE)

(73) Assignee: Saab Marine Electronics AB, Gotenborg (SE)

(*) Notice: Subject to any disclaimer, the term of this patent is extended or adjusted under 35 U.S.C. 154(b) by 0 days.

(21) Appl. No.: 10/327,815

(22) Filed: Dec. 20, 2002

(51) Int. Cl.[7] .................. G01F 23/284; G01S 13/88
(52) U.S. Cl. .................. 342/124; 342/118; 342/127; 342/128; 342/134
(58) Field of Search .................. 342/27, 28, 73, 342/74, 75, 81, 82, 89, 118, 119–133, 159–175, 192–197, 134–145, 22; 73/290 R, 291, 304 R, 304 C, 305–322.5

(56) References Cited

U.S. PATENT DOCUMENTS

| 4,566,321 | A | * | 1/1986 | Zacchio ................. 342/124 |
| 4,641,139 | A | * | 2/1987 | Edvardsson ............. 342/124 |
| 4,670,754 | A | * | 6/1987 | Zacchio ................. 342/124 |
| 5,420,591 | A |   | 5/1995 | Annee et al. ............ 342/188 |
| 5,504,490 | A |   | 4/1996 | Brendle et al. .......... 342/118 |
| 5,543,720 | A |   | 8/1996 | Edvardsson |
| 5,677,694 | A |   | 10/1997 | Chevalier et al. ........ 342/45 |
| 5,969,666 | A | * | 10/1999 | Burger et al. ........... 342/124 |
| 6,198,424 | B1 | * | 3/2001 | Diede et al. ............ 342/124 |
| 6,229,476 | B1 | * | 5/2001 | Lutke et al. ............ 342/124 |
| 6,246,357 | B1 |   | 6/2001 | Uchara ................. 342/70 |
| 6,295,018 | B1 | * | 9/2001 | Diede et al. ............ 342/124 |
| 6,415,660 | B1 |   | 7/2002 | Sinz et al. ............. 73/290 R |

FOREIGN PATENT DOCUMENTS

| DE |   | 19860901 A1 | 7/2000 |
| WO | WO 96/25647 A1 | 8/1996 |
| WO | WO 01/02819 A1 | 1/2001 |

* cited by examiner

Primary Examiner—Bernarr E. Gregory
(74) Attorney, Agent, or Firm—Westman, Champlin & Kelly, P.A.

(57) ABSTRACT

A method for radar-based gauging of the level of a substance in a tank (13) having at least one interfering structure (16a–c), comprises the steps of: (i) transmitting a microwave signal in a plurality of radiation lobes (15a–b; 15a–d), each of which being individually directed towards the substance and at least one of which being directed towards the interfering structure; (ii) for each of the radiation lobes detecting temporally resolved the microwave signal as reflected against the substance, and for at least one of the lobes detecting the microwave signal as reflected against the interfering structure; (iii) based on signal strengths of the detected microwave signals, distinguishing the detected microwave signals, which have been reflected against the substance; and (iv) based on a propagation time of at least one of the microwave signals distinguished as those, which have been reflected against the substance, calculating the level of the substance.

30 Claims, 5 Drawing Sheets

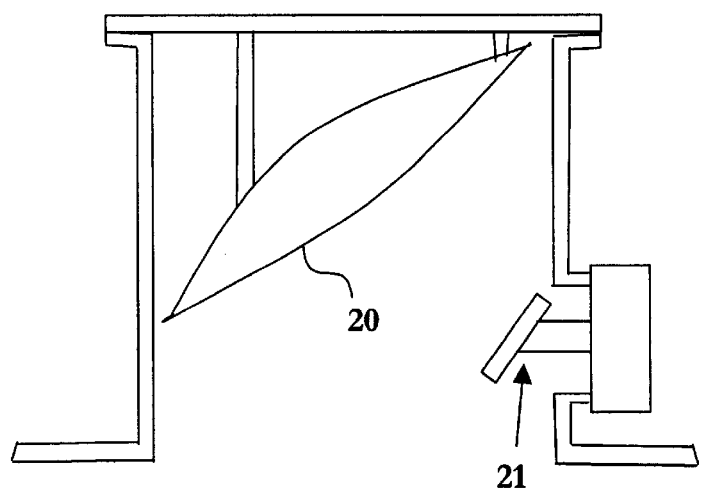
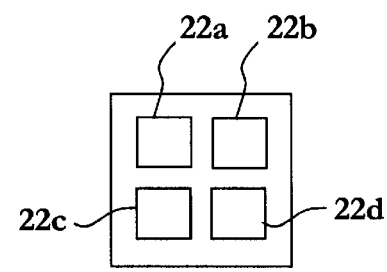
Fig. 2a            Fig. 2b
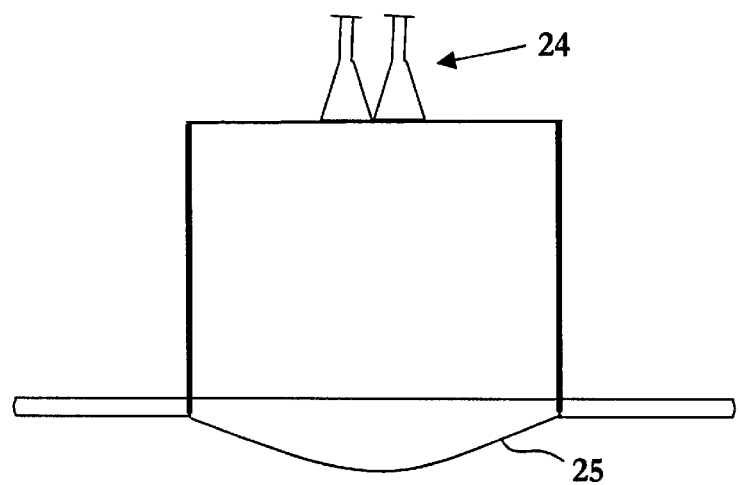
Fig. 2c

Fig. 2d  Fig. 2e

METHOD AND APPARATUS FOR RADAR-BASED LEVEL GAUGING

FIELD OF THE INVENTION

The invention relates generally to level gauging, and more specifically the invention relates to a method and an apparatus for radar-based level gauging.

BACKGROUND OF THE INVENTION AND RELATED ART

Radar-based methods are extensively used for level gauging, i.e. measuring a distance from the top of a tank to a surface of a liquid or some kind of granular solid stored in the tank, by means of transmitting a microwaves towards the surface of the liquid or the granular solid, receiving the microwaves as reflected against the surface of the liquid or solid, and calculating the level of the liquid or solid in the tank from the propagation time of the transmitted and reflected microwaves.

One very general problem in this respect is that the tank typically includes various structures, such as support beams, pipes, agitators, tank walls, etc. Such structures may also reflect microwaves, which can interfere with the microwaves reflected from the surface of the liquid or solid, the level of which being gauged. Many liquids are comprised of oil and petroleum products, which have a rather low dielectric constant, i.e. below 3, which makes the microwave echo from a smooth surface about 12–20 dB weaker than an echo from a metallic surface. If the surface is turbulent the signal strength of the echo will be further reduced, i.e. about 6–20 dB weaker depending on antenna size, and as a conclusion an echo from a geometrically small metallic structure can easily be stronger than the echo from a turbulent oil surface.

One method which has been used for a long time in radar level gauging is to mechanically incline the antenna slightly to suppress echoes from disturbing objects more than the echo from the surface, i.e. to improve signal-to-disturbance ratio.

The selection of correct microwave echo is thus extremely important and any possibility of distinguishing microwave signals reflected from the surface of the liquid or solid from microwaves reflected from other structures is very useful.

Typically, prior art radar level gauges typically select the strongest echo as detected within the antenna beam.

The ideal case is to use an antenna with a rather narrow lobe located in the tank where no disturbing echoes are close to the antenna lobe. In this case the surface echo may be the strongest one even after some degradations due to turbulence, foam etc. For smaller tanks various tank structures may approach the antenna beam, not at least since the antenna has to be smaller. Furthermore when the echo from the surface is close to a disturbing echo there is a possibility for a large measuring error.

SUMMARY OF THE INVENTION

A main object of the invention is thus to provide a method and an apparatus for radar-based level gauging, wherein detected microwaves as reflected from the surface of the liquid or solid can be distinguished from detected microwaves as reflected from other disturbing structures.

In this respect there is a particular object of the invention to provide such a method and such an apparatus, which are very useful in tanks having a large number of disturbing structures and in tanks where the radar-based level gauging equipment has to be mounted in regions where disturbing structures do occur.

A further object of the present invention is to provide such a method and such an apparatus, which provide for level gauging also of highly turbulent surfaces, where the reflected microwaves are weak.

A still further object of the invention is to provide such a method and such an apparatus, which are reliable, efficient, accurate, and precise.

A yet further object is to provide such a method and such an apparatus, wherein a dynamic cancellation algorithm is formed in order to strongly decrease the influence of disturbing echoes and thus increase the accuracy of the level measurement.

These objects, among others, are attained by methods and apparatuses as claimed in the appended claims.

According to a first aspect of the present invention there is provided a method for radar-based gauging of the level of a substance, e.g. a liquid or a granular solid, in a tank having at least one interfering structure, such as e.g. a beam, an agitator, or a tank side wall. The method comprises transmitting a microwave signal in a plurality of differently directed radiation lobes, e.g. two or four lobes, where each radiation lobe is directed towards the surface of the substance and at least one of the radiation lobes is directed towards the interfering structure. Typically, there may be a number of interfering structures in each radiation lobe.

For each of the radiation lobes, the microwave signal as reflected against the surface of the substance is detected and so is the microwave signal as reflected against any interfering structure(s). Thereafter, based on signal strengths of the detected microwave signals, the detected microwave signals, which have been reflected against the surface of the substance, are distinguished.

Finally, based on a propagation time of at least one of the microwave signals distinguished as those, which have been reflected against the surface of the substance, the level of the substance in the tank is calculated.

Preferably, the detected microwave signals, which have been reflected against the surface of said substance, are distinguished by means of their similar signal strengths, optionally after correction for the inclination of the respective lobes. It is well known that a surface echo from a vertical radiation lobe is stronger than a surface echo from an inclined radiation lobe. Thus, these signal strength differences originating from inclination angles of the radiation lobes may be compensated for.

Still preferably, the differently directed radiation lobes are separated by about 0.5–1 times the radiation lobe width of any of the plurality of differently directed radiation lobes, wherein one of the radiation lobes can be essentially vertical. Typically, the widths of the radiation lobes are similar. By such separation the lobes can be arranged to have small coupling, which is a prerequisite for independent function of the lobes. Depending on the particular application some radiation lobes may be more inclined than others.

In a typical implementation of the present invention four differently directed radiation lobes are produced, all of which having the same inclination. A surface echo will have about the same amplitude in each of these four lobes, while a disturbing echo will have very different amplitudes in the four radiation lobes and the disturbing echo in the lobe(s) pointing most away from the disturbing structure will have very low amplitude. Thus this method will not only provide a diagnostic method to distinguish echoes originating from the surface to be gauged from those originating from fixed disturbing structure(s), but also provide means for selecting the optimum radiation lobe, i.e. the lobe having highest signal-to-disturbance ratio, for subsequent use. Obviously, different radiation lobes may be optimum for different tank environments and different levels of the gauged surface Antenna devices capable of producing multi-lobe microwave radiation and of receiving reflected microwave radiation in each lobe separately include parabolic antennas fed by multiple horns, or planar antennas with suitable feeding networks. Two preferred planar antennas are patch arrays fed by Butler or Blass matrices.

According to a second aspect of the present invention there is provided a radar-based level gauge apparatus for performing the method according to the first aspect of the invention.

By means of the present invention a very robust routine for distinguishing detected microwave signals, which have been reflected against the surface of the substance gauged, may be implemented. As compared to prior art devices the invention provides for measurement in more disturbing environments, i.e. where more interfering echoes do occur, with higher accuracy. For instance, microwave signals reflected at the surface of the substance, may be distinguished despite being weaker to much weaker than a microwave signal as reflected against an interfering structure.

The radar-based level gauges are used to measure levels in tanks, which for the purpose of the present invention include not only large containers but also processing apparatuses such as, for example, reactors, centrifuges, mixers, hoppers, graders, or heat-treatment furnaces and similar devices, which are used in e.g. food chemistry, pharmaceutical chemistry, biochemistry, gene chemistry and petrochemistry.

Further characteristics of the invention, and advantages thereof, will be evident from the detailed description of preferred embodiments of the present invention given hereinafter and the accompanying FIGS. 1–4, which are given by way of illustration only, and thus are not limitative of the present invention.

BRIEF DESCRIPTION OF THE DRAWINGS

FIGS. 2a–h illustrate schematically various implementations of antenna structures used in radar-based level gauging apparatuses of the present invention.

DESCRIPTION OF PREFERRED EMBODIMENTS

Figure 1A:
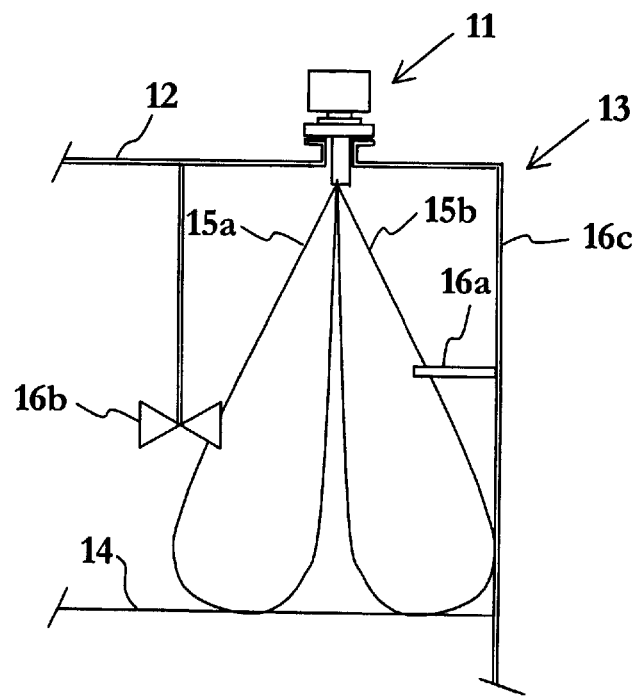
FIGS. 1a–b illustrate schematically, in side views, apparatuses for radar-based level gauging according to two embodiments of the present invention.

With reference to FIG. 1a, which schematically illustrates, in a side view, an apparatus aimed for radar-based level gauging, a preferred embodiment of the present invention will be described. The apparatus may be a frequency modulated continuous wave (FMCW) radar apparatus, a pulsed radar apparatus, or any other type of distance measuring radar.

The radar-based level gauge, denoted by 11 in FIG. 1a, is mounted above an opening of a roof 12 of a tank 13 or container filled with a liquid or a granular solid, the level 14 of which being gauged. The tank 13, of which only portions are shown in FIG. 1a, has typically a number of structures, e.g. a support beam 16a, an agitator 16b and a tank side wall 16c, that may create disturbing microwave reflections within the tank.

During operation, the radar-based level gauge 11 transmits a microwave signal towards the surface 14 of the liquid or granular solid in the tank 13, and receives the microwave signal as reflected against the surface, i.e. the surface echo. Further, the radar-based level gauge 11 comprises, or is connected to, a signal processing device (not explicitly illustrated) for calculating from the propagation time of the microwave signal from the radar-based level gauge 11 to the level 14 of the liquid or granular solid, and back to the radar-based level gauge 11.

The expression propagation time is used throughout this text as a general expression for a result of distance calculations. Several types of radar-based apparatuses are known for detection of echoes and distance evaluations. Different radar-based apparatuses use different methods and different intermediate results will occur. In each case, however, the radar input signal can be described as echoes of different amplitude and phase ordered after their delay time as compared to the transmitted signal.

One example is a pulsed radar-based level gauging apparatus, where a sampling technique is used for re-scaling or stretching the time by a factor 1,000–1,000,000. Another example is the FMCW radar-based level gauging apparatus, where a usually linear frequency sweep results in a spectrum where the propagation time is translated to intermediate frequency (IF). In this case the IF signal corresponds to the Fourier transform of the IF signal for the pulsed case. The very short time differences (1.5 mm distance corresponds to 0.01 ns) will in both cases be translated (downscaled) to signals with a much more handy time and frequency behaviour and thus the signal processing is simplified and components having lower price, lower current consumption etc. can be used.

According to the present invention the radar-based level gauge 11 transmits a microwave signal in a plurality of differently directed radiation lobes 15a–b, where each lobe is directed towards the surface 14 of the liquid or granular solid. The inclination angle may be similar for all lobes, similar for some lobes and different for some lobes, or different for all lobes.

Further, the surface echo and any interfering echo from the disturbing structures 16a–c are detected temporally resolved for each of the radiation lobes 15a–b. By temporally resolved is here meant that the delay times as compared to the transmitted signal, or other parameter values depending thereon, are recorded for the echoes.

Then, based on signal strengths of the detected echoes, the surface echoes can be distinguished. This is possible since the signal strengths of the surface echoes are similar for all radiation lobes, optionally after correction for the inclination of the respective lobes, in contrast to echoes from the disturbing structures 16a–c, which have signal strengths that vary quite lot from lobe to lobe.

Finally, based on the propagation time of at least one of the surface echoes the level of the liquid or granular solid is determined.

By means of the echo selection procedure of the present invention, surface echoes having signal strengths, which are much lower than signal strengths of interfering echoes, are detectable and distinguishable. Hence, also weak echoes from very turbulent surfaces may be found and the levels of such surfaces may thus be gauged.

Figure 1B:
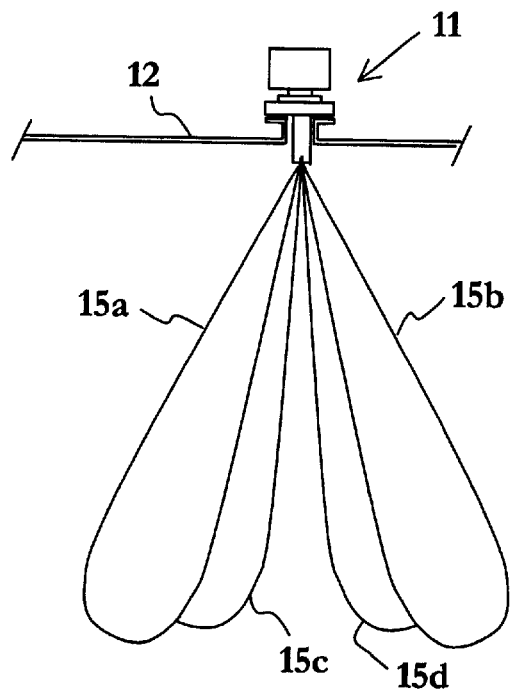

In FIG. 1b is schematically illustrated, in a side view, another preferred embodiment of the radar-based level gauging apparatus, which produces and receives microwave radiation in four differently directed radiation lobes 15a–d. Generally, there is no limitation as regards the number of radiation lobes used. However, the more radiation lobes produced, the more complex transmitter/receiver sections of the apparatus are needed, and the more processing capacity is needed.

General for all embodiments is that at least one of the radiation lobes 15a–d may be essentially vertical.

It should be noted that a turbulent surface will give a weaker average echo but on the other hand it will be much less sensitive for the direction of the radiation lobe. Thus, at least one of the radiation lobes may have a symmetry axis, which deviates from a vertical direction by an angle large enough to direct any surface echo from a calm surface away from the gauge. Thus, a surface echo can only be detected in that lobe provided that the surface is turbulent, and the presence of a surface echo is then an indication of a turbulent environment in the tank.

Preferably, the directions of the radiation lobes 15a–d are slightly different. They may advantageously be separated by about 0.5–1 times the width of the radiation lobes, at which distance they can be arranged to have a small coupling.

Besides the signal strength the phase of the radar signal is important. The amplitude and phase of a signal is called the complex amplitude. Depending on details in the radar-based level gauging apparatus the amplitude only or both amplitude and phase are measured.

Next, with reference to FIGS. 2a–d various implementations of the antenna structure used for sending and receiving the microwaves in an apparatus of the present invention. Note that while only a few examples are explicitly given below, the present invention is not limited to those, but can be implemented by any structure capable of sending and receiving microwaves in multiple lobes separately. However, radar level gauges are low cost items as compared to most other radar equipment, and thus the antenna structure used is preferably simple and of low cost compared to e.g. the typically very complicated and expensive equipment used in for instance many military radar systems with electronically steered antennas.

FIG. 2a shows in a side view one implementation based on a parabolic antenna. An off-set fed parabola 20 is mounted on the top of the tank in a geometry giving essentially vertical antenna beams when a feeder 21 is mounted in the focal point of the parabola. The feeder includes a feeder head, which is illustrated in a front view in FIG. 2b, which is provided with four antennas 22a–d with a geometrical distribution around the point of focus. The feeder head is made on a flat microstrip/stripline board, which is mounted by a support and connected to electronic circuits of the gauge. The four antennas 22a arranged as illustrated create four non-parallel antenna lobes with a direction spread around the vertical axis.

In FIG. 2c is shown in a side view a lens antenna fed by multiple feed horns 24. The lens 25 of the lens antenna is both a barrier to the tank environment and part of the antenna. Four horn antennas 24 (of which only two are shown in the side view of FIG. 2b) are located above the lens 25 close to the focus point thereof. Clearly this geometry can be arranged to create four antenna lobes, each with a non-vertical direction spread around the vertical axis. Each radiation lobe is connected via a separate antenna horn.

In FIG. 2d is illustrated in a side view a planar antenna 26 arranged as a linear array with each of eight array elements made of a number of patches (not illustrated). The linear array, illustrated in a front view in FIG. 2e, is fed by a network giving a progressive phase along the array and thus creating radiation with a maximum in the direction where all elements radiate in phase. The array elements can be connected to a Butler matrix feed network which is a well known way of generating several antenna lobes (4, 8 16 etc.) which are insulated and fed from one input each. If the direction of the array as in the Figure is directed perpendicular to the tank wall, radiation lobes of different inclination relative to the tank-wall can be created. This can be used to optimize the direction relative the tank-wall and also to allow a simpler mounting where the fine-adjustment of the direction is performed electrically rather than mechanically—even if the tank roof have an inclination not well known before-hand. Of course the linear-array can be fed by other types of feeding circuits such as a Blass array or a frequency dependent lobe-steering arrangement.

Figure 2F:
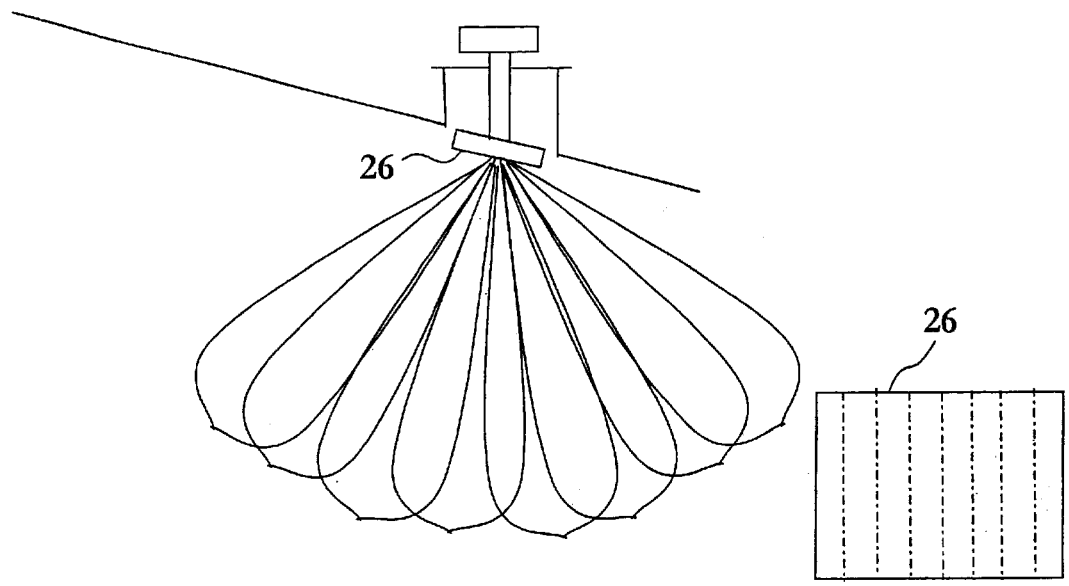
Figure 2F:
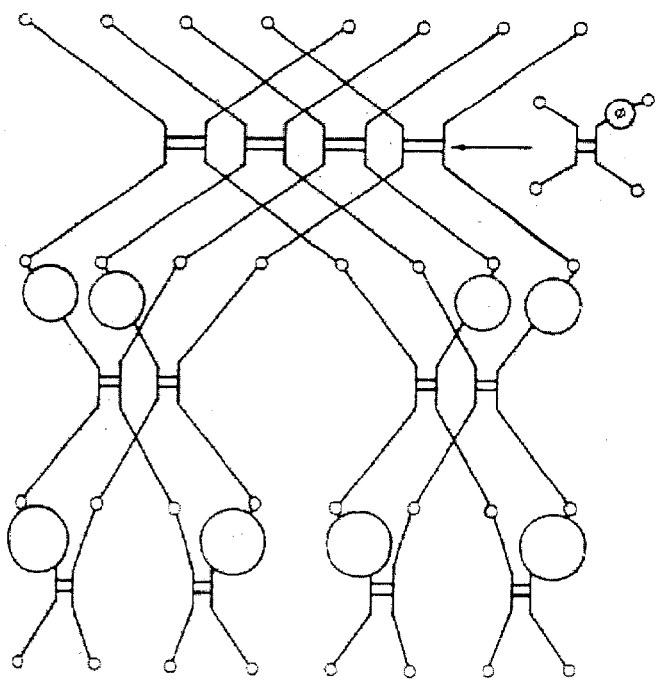

FIG. 2f shows details of the Butler matrix used for feeding the antenna illustrated in FIGS. 2d–e, which is made by a network of 90°-power (3 dB) and some short delay lines to give desired phase shifts. The pattern is made by printed circuit boards and can thus be produced in a cost effective manner.

Figure 2G:
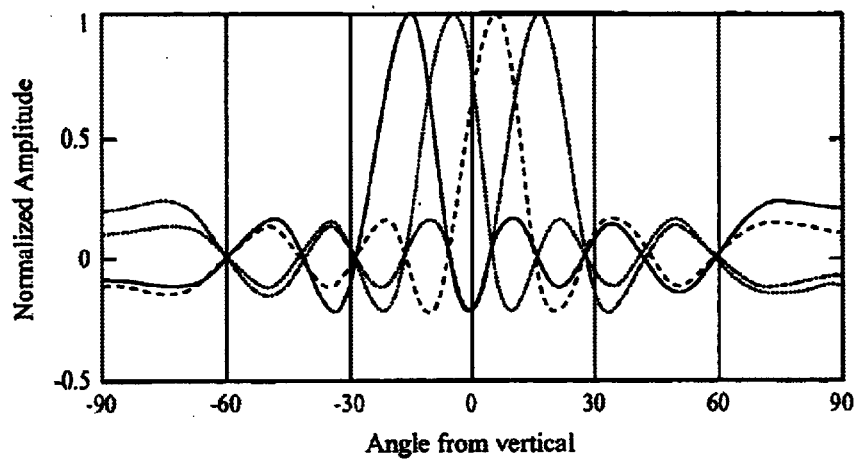

FIG. 2g indicates the antenna pattern for a Butler matrix with the four central lobes of a x8 Butler matrix. It should be pointed out that the pattern has zeroes coinciding with the maxima of the other lobes, which minimizes the coupling between the lobes. Each lobe is fed by a separate connection. The pattern in the illustrated example is for a 250 mm long antenna with eight equally distributed elements and the wavelength is 52 mm (corresponding to frequency of 5.8 GHz, which is a commonly used frequency for level gauging).

Figure 2H:
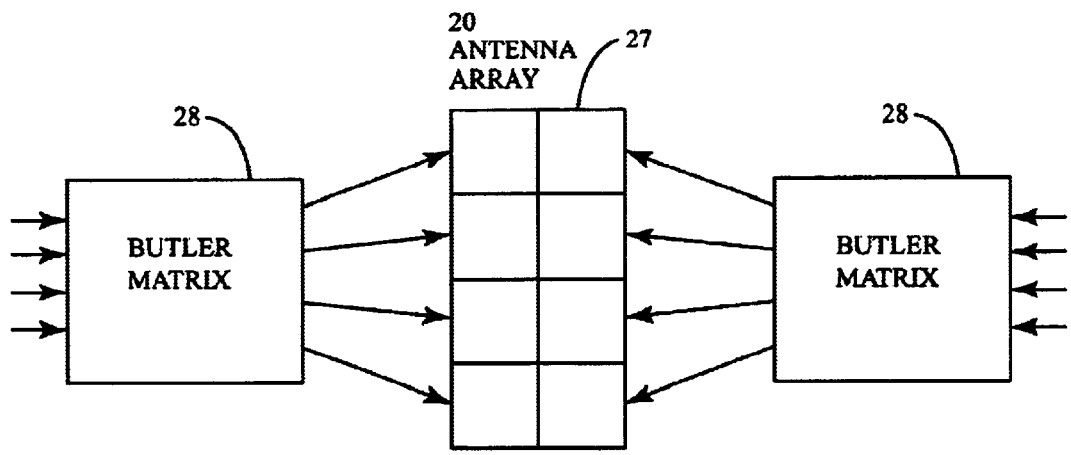

FIG. 2h illustrates in a front view a two-dimensional antenna array 27 fed by two Butler matrices 28 to give 2×4 radiation lobes. In the horizontal direction the steering can alternatively be implemented by a frequency depending array arrangement, where a number of frequencies are used to create different lobes. If the number of lobes in the horizontal direction is limited to two, a quite simple arrangement can be used such as a x2 Butler matrix of a direction sensitive array fed from two alternative directions.

The echo selection routine is implemented in the signal processing included in, or associated with, the radar-based level gauge 11.

The routine may include generating, separately for each radiation lobe, the amplitude of the received reflected microwave signal as a function of propagation time up to reception. Noticeably, the surface of the liquid or granular solid gauged will give echoes of about the same amplitude in each lobe, whereas disturbing obstacles in the tank will give echoes of very different amplitudes in the different radiation lobes.

With a more complicated unit having many antenna lobes the selection of lobes can also be used to simplify mechanical mounting and alignment by only using those lobes which are fairly close to the vertical direction.

Figure 3:
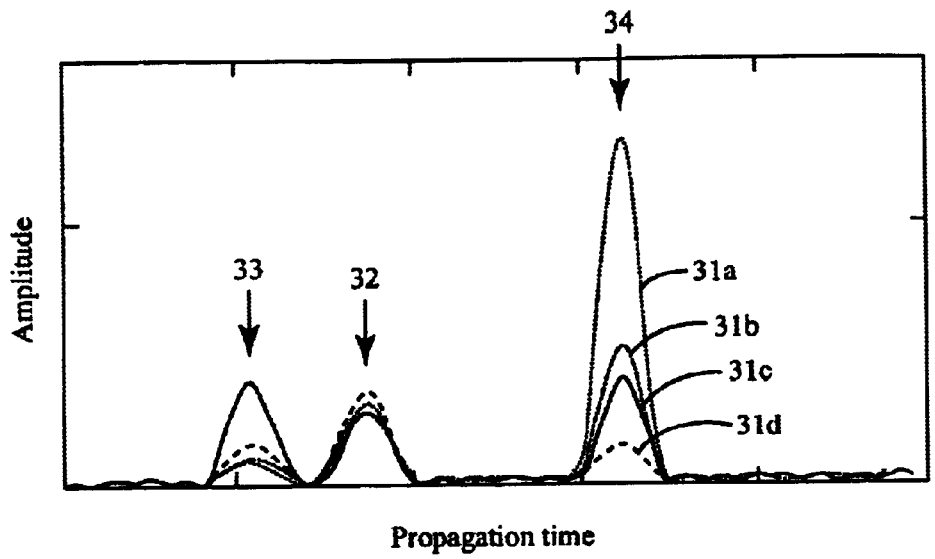
FIG. 3 shows schematically a diagram of the amplitude of the received reflected microwave signal as a function of propagation time for four different radiation lobes as obtained by the apparatus of FIG. 1b indicating microwave signals as reflected from the surface of the matter gauged and from a fixed structure in the tank.

FIG. 3 shows schematically an example of a diagram of the amplitude of the received reflected microwave signals as a function of propagation time for four different radiation lobes. The lobes are assumed to be symmetrical around the plumb-line and are directed away from the plumb-line with the same angle, but in different directions. The received reflected microwave signal amplitude in lobe 15a is indicated by 31a, the signal amplitude in lobe 15b is indicated by 31b, the signal amplitude in lobe 15c is indicated by 31c, and the signal amplitude in lobe 15d is indicated by 31d.

Three microwave signal echoes 32, 33, 34 are clearly visible. By analyzing the amplitudes of the echoes it is established that the echo 32 is reflected from the surface of the liquid or granular solid gauged, i.e. the echo 32 has similar strengths in all four lobes. The echo to the right 34 is a disturbing echo, where the dotted curve 31a corresponds to the radiation lobe closest to the structure creating the disturbing echo. The dashed curve 31d corresponds to the radiation lobe furthest away from the disturbing structure and that radiation lobe indicates a suitable choice in this case. The disturbing echo 32 is created by a disturbing structure, which is located closest to the radiation lobe giving the solid curve 31c, while the dashed-dotted curve 31b gives a fair suppression of that echo and should be used when the level of the gauged matter is close to the distance indicated in the Figure.

With a suitable logic, selection of the correct surface echo can be made even if the surface echo is not the strongest one.

Figures 4A, 4B:
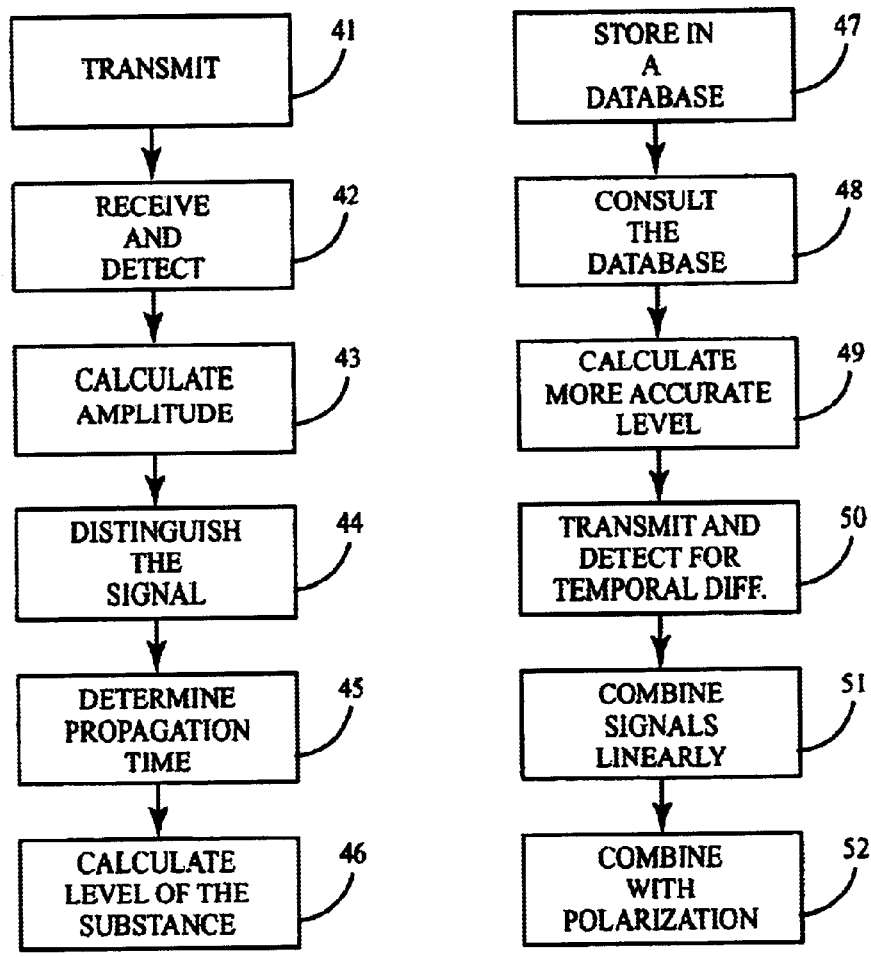
FIGS. 4a–b are schematic flow diagrams illustrating methods for radar-based level gauging according to two preferred embodiments of the present invention.

Thus, a method for radar-based gauging of the level of a substance in a tank is schematically shown in the flow scheme of FIG. 4a. A microwave signal is, in a step 41, transmitted in four differently directed radiation lobes as illustrated in FIG. 1b. For each of the four radiation lobes, the microwave signal as reflected towards the surface of the substance gauged and towards any disturbing structures, is, in a step 42, received and detected. Then, for each of the four radiation lobes, the amplitude of the detected reflected microwave signal as a function of propagation time is, in a step 43, calculated. By comparison of the four functions as being illustrated in FIG. 3 the microwave signal 32 as reflected against the surface is, in a step 44, distinguished for each lobe. Finally, in steps 45 and 46, the propagation time for the microwave signal 32 as reflected against the surface is determined from one of the functions, e.g. 31d, and the level of the substance is calculated from the propagation time.

In FIG. 4b is shown a flow scheme with some optional steps, which may be added to the method as described with reference to FIG. 4a.

The amplitude of the received reflected microwave signals as a function of propagation time for a number of distance cells, i.e. levels intervals of the surface of the gauged matter, and for each different radiation lobe may, in a step 47, be stored in a database. Then knowledge of the localization of disturbing structures and interfering echoes in a particular tank may be collected with time. Once having a database this may, in a step 48, be consulted when a gauged level has been calculated. By means of the data in the database it can be established which radiation lobe is most favorable to be used for the calculation, and if this radiation lobe was not used, a new more accurate measure of the gauged level can, in a step 49, be calculated. In an environment with a limited number of interfering echoes, these can be avoided by selecting a radiation lobe pointing away from the disturbing structures creating these echoes, and when the surface is at another level another antenna lobe can be chosen as being the most favorable for pointing away from that or an other disturbing structure.

A further option is to repeat the steps of transmitting and detecting, i.e. steps 41 and 42, and basing the step of distinguishing, i.e. step 44, also on the temporal variation in signal strengths of the detected microwave signals. Such procedure is schematically indicated by box 50 in FIG. 4b, and can be used for distinguishing echoes having a slow (and possibly periodic) temporal variation (and large difference between the lobes) as echoes from agitators or other movable structure in the tank.

A still further option is to combine the detected microwave signals from the different lobes linearly to artificially form signals from intermediate lobes. By this procedure as is schematically indicated by box 51 in FIG. 4b, measurement accuracy close to disturbing structures can be improved. To make cancellation of disturbing echoes efficient a larger number of used radiation lobes may be necessary as intermediate lobes with nulls in desired directions preferably are created by interpolation.

A yet further option is to combine any of the method or method steps identified above with the use of polarization diversity as is schematically indicated by box 52 in FIG. 4b. In this respect reference is made to our co-pending European patent application No. 02445190.8, entitled "Method and apparatus for radar-based level gauging" (inventor; Kurt-Olov Edvardsson) and filed Dec. 20, 2002.

What is claimed is:

1. A method for radar-based gauging of the level of a substance in a tank having at least one interfering structure, comprising the steps of:

transmitting a microwave signal in a plurality of differently directed radiation lobes, each of which being directed towards a surface of said substance and at least one of which being directed towards said at least one interfering structure;

detecting temporally resolved, for each of said plurality of differently directed radiation lobes, the microwave signal as reflected against the surface of said substance, and, for at least one of said plurality of differently directed radiation lobes, the microwave signal as reflected against said at least one interfering structure;

distinguishing based on signal strengths of said detected microwave signals, the detected microwave signals, which have been reflected against the surface of said substance; and calculating based on a propagation time of at least one of the microwave signals distinguished as those, which have been reflected against the surface of said substance, the level of said substance in said tank.

2. The method of claim 1 wherein the detected microwave signals, which have been reflected against the surface of said substance, are distinguished by means of their similar signal strengths.

3. The method of claim 2 wherein the detected microwave signals, which have been reflected against the surface of said substance, are distinguished by means of their similar signal strengths after correction for inclination angles of said plurality of differently directed radiation lobes.

4. The method of claim 1 wherein the signal strengths of the detected microwave signals, which have been reflected against the surface of said substance, are weaker than the signal strength of the detected microwave signal, which has been reflected against said at least one interfering structure.

5. The method of claim 1 wherein the microwave signal is transmitted in at least four differently directed radiation lobes.

6. The method of claim 1 wherein at least one of said plurality of differently directed radiation lobes is essentially vertical.

7. The method of claim 1 wherein at least one of said plurality of differently directed radiation lobes has a symmetry axis, which deviates from a vertical direction by an angle large enough so the microwave signal in said radiation lobe as reflected against the surface of said substance, becomes significantly stronger for a turbulent surface of said substance than for a calm surface of said substance.

8. The method of claim 1 wherein the directions of said plurality of differently directed radiation lobes are only slightly different.

9. The method of claim 1 wherein the directions of said plurality of differently directed radiation lobes are separated by about 0.5–1 times a radiation lobe width of any of said plurality of differently directed radiation lobes.

10. The method of claim 1 wherein said substance is a liquid.

11. The method of claim 1 wherein said substance is a granular solid.

12. The method of claim 1 wherein said at least one interfering structure is any of a beam, an agitator, or a tank side wall.

13. The method of claim 1 wherein
a signal strength as a function of propagation time for each reflected microwave signal in each of said plurality of differently directed radiation lobes is deduced; and
the detected microwave signals, which have been reflected against the surface of said substance, are distinguished by means of comparing said functions.

14. The method of claim 13 wherein said at least one of the distinguished microwave signals is selected by means of comparing said functions.

15. The method of claim 1 wherein the signal strength of each detected microwave signal is stored in a database.

16. The method of claims 1 wherein said at least one of the distinguished microwave signals is selected depending on the level of said substance.

17. The method of claim 1 wherein said at least one interfering structure is localized based on said step of detecting.

18. The method of claim 1 wherein
said steps of transmitting and detecting are repeated; and
said step of distinguishing is based also on the variation in signal strengths of the repeatedly detected microwave signals.

19. The method of claim 1 wherein said steps of transmitting and detecting are performed by a device including any of a reflector antenna; a parabolic antenna; a lens antenna; or a planar antenna.

20. The method of claim 19 wherein said any of a reflector antenna; a parabolic antenna; a lens antenna; or a planar antenna is fed by a Butler matrix.

21. The method of claims 1 wherein the phase of each of said detected microwave signals is measured.

22. An apparatus for radar-based gauging of the level of a substance in a tank having at least one interfering structure, comprising:

a transmitter for transmitting a microwave signal in a plurality of differently directed radiation lobes, each of which being directed towards a surface of said substance and at least one of which being directed towards said at least one interfering structure;

a detector adapted to detect temporally resolved, for each of said plurality of differently directed radiation lobes, the microwave signal as reflected against the surface of said substance, and, for at least one of said plurality of differently directed radiation lobes, the microwave signal as reflected against said at least one interfering structure; and a processing device adapted to distinguish, based on signal strengths of the detected microwave signals, the detected microwave signals, which have been reflected against the surface of said substance; and to calculate, based on a propagation time of at least one of the microwave signals distinguished as those, which have been reflected against the surface of said substance, the level of said substance in said tank.

23. The apparatus of claim 22 wherein said processing device is adapted to distinguish the detected microwave signals, which have been reflected against the surface of said substance, by means of their similar signal strengths, optionally after correction for inclination angles of said plurality of differently directed radiation lobes.

24. The apparatus of claim 22 wherein said transmitter is adapted to transmit the microwave signal in at least four differently directed radiation lobes.

25. The apparatus of claim 22 wherein at least one of said plurality of differently directed radiation lobes is essentially vertical.

26. The apparatus of claim 22 wherein the directions of said plurality of differently directed radiation lobes are separated by about 0.5–1 times the radiation lobe width of any of said plurality of differently directed radiation lobes.

27. The apparatus of claim 22 wherein said at least one interfering structure is any of a beam; an agitator or a tank side wall.

28. The apparatus of claim 22 wherein
said transmitter and said detector are adapted to repeatedly transmit and detect; and
said processing device is adapted to distinguish the detected microwave signals, which have been reflected against the surface of said substance, depending on the variation in signal strengths of the repeatedly detected microwave signals.

29. The apparatus of claims 22 wherein said transmitter and said detector include any of a reflector antenna; a parabolic antenna; a lens antenna; or a planar antenna.

30. The apparatus of claim 29 wherein said any of a reflector antenna; a parabolic antenna; a lens antenna; or a planar antenna is fed by a Butler matrix.

* * * * *